US007318192B1

(12) United States Patent
Hobbs et al.

(10) Patent No.: US 7,318,192 B1
(45) Date of Patent: Jan. 8, 2008

(54) METHOD AND SYSTEM FOR FORMULAICALLY BOUNDING DATA IN A SPREADSHEET

(75) Inventors: Craig A. Hobbs, Seattle, WA (US); Scott Morgan LeGendre, Bainbridge Island, WA (US); Mark Thomas Nelson, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 305 days.

(21) Appl. No.: 10/811,234

(22) Filed: Mar. 26, 2004

(51) Int. Cl.
*G06F 15/00* (2006.01)
(52) U.S. Cl. ................ 715/503; 715/504; 715/508
(58) Field of Classification Search .............. 707/10, 707/102; 717/106; 715/503, 508
See application file for complete search history.

(56) References Cited

U.S. PATENT DOCUMENTS 6,374,252 B1 * 4/2002 Althoff et al. .............. 707/102

2004/0006762 A1 * 1/2004 Stewart et al. .............. 717/106

OTHER PUBLICATIONS

Angie Wethington, "Secial Edition Using Microsoft Excel 2000", May 1999, Que Corporation, cover pages and pp. 545-549.*

* cited by examiner

*Primary Examiner*—Doug Hutton
*Assistant Examiner*—Quoc A. Tran
(74) *Attorney, Agent, or Firm*—Merchant & Gould P.C.; Ryan T. Grace

(57) ABSTRACT

Methods and systems are provided for bounding data entered into one or more spreadsheet application cells. A bounding function is applied to a given cell that places bounds on values or formula results that may be entered into the cell. If a user enters a value to a bounded cell that exceeds or otherwise violates the bounds applied to the cell, or if a formula directed to the cell evaluates a value to the bounded cell that exceeds or otherwise violates the bounds applied to the cell, the value entered into the cell will be a value most closely approximating the desired value or evaluated value, but that does not exceed or otherwise violate the bounds set for the cell.

25 Claims, 3 Drawing Sheets

METHOD AND SYSTEM FOR FORMULAICALLY BOUNDING DATA IN A SPREADSHEET

FIELD OF THE INVENTION

The present invention generally relates to spreadsheet application systems. More particularly, the present invention relates to formulaically bounding data in a spreadsheet application cell.

BACKGROUND OF THE INVENTION

Spreadsheet applications provide many well-known benefits including data organization, computation, analysis and presentation. Some popular spreadsheet applications provide users worksheets and shapesheets comprised of cells in which data may be entered, computed and related to data in other cells. For example, a spreadsheet worksheet may allow a user to enter and total sales figures. Mathematical formulas may be applied to the spreadsheet cells to perform desired calculations on data contained on one or more cells. Spreadsheet application shapesheets allow users to create drawings, images, flowcharts and the like. In such shapesheets, data may be applied to cells comprising the shapesheet for controlling properties such as shape, width, height and the like.

According to such spreadsheet systems, users are free to enter any value or formula into a given spreadsheet cell that is otherwise allowable by the spreadsheet application, but that may produce an undesirable result. For example, a spreadsheet-based template may be developed where cell A1 represents percentage of sales between 0 and 100%. Even though an undesirable result may be obtained or presented, a user is free to enter a value outside the intended bounds of the cell, for example, 500%. In the context of spreadsheet shapesheets, a drawing template may be designed where cell A1 represents the width of a shape and cell A2 represents the height of the shape. In order for the shape to remain visually proportional and remain sized to fit properly on a given page, it may be desirable that the width of the shape be no less than one inch and no more than five inches (for example). However, even though an undesirable result may be obtained, a user is free to set the width beyond the intended bounds of the cell, for example eight inches.

There is a need in the art for a method and system for bounding the value of the content of a spreadsheet cell so that only values that are valid according to desired bound ranges may be entered into the cell. It is with respect to these and other considerations that the present invention has been made.

SUMMARY OF THE INVENTION

Embodiments of the present invention solve the above and other problems by providing methods and systems for bounding data entered into one or more spreadsheet application cells. Generally described, a bounding function is applied to a given cell that places bounds on values or formula results that may be entered into the cell. If a user enters a value to a bounded cell that exceeds or otherwise violates the bounds applied to the cell, or if a formula directed to the cell evaluates a value to the bounded cell that exceeds or otherwise violates the bounds applied to the cell, the value entered into the cell will be a value most closely approximating the desired value or evaluated value, but that does not exceed or otherwise violate the bounds set for the cell. For example, if a given cell is bounded to values between 1 and 5, and a user enters a value of 6, a value of 5 may be entered because 5 most closely approximates the desired value of 6, but does not exceed or violate the bounds set for the cell.

More particularly described, in a spreadsheet application, a novel spreadsheet function is provided for formulaically bounding the value of the content of a spreadsheet cell so that only values that are valid according the prescribed bounds may be entered into the cell. According to aspects of the invention, the BOUND function comprises an optional value argument, a type argument, a disabled argument, a boundMin (bound minimum) argument and a boundMax (bound maximum) argument. The value argument represents data associated with a value to be applied to the cell and to be validated by the BOUND function. The type argument allows for the entered value to be validated against an inclusive bound or an exclusive bound. The type argument also allows for the BOUND function to be disabled whereby any entered or evaluated value is accepted as entered without regard to the bounds set in the BOUND function. The bound minimum and bound maximum arguments allow for inclusive and exclusive bound ranges to be applied to the applicable spreadsheet cell.

In operation, when a value is entered into a bounded cell or when a value formulaically evaluates to a bounded cell, the value is validated against the constraints of a BOUND function applied to the cell. If the value is within the bounds of a BOUND function inclusive bound range applied to the cell, then the value is entered. If the value is outside an inclusive bound range, a determination is made as to which inclusive bound range endpoint the entered value most closely approximates. The most closely approximated inclusive bound range endpoint is returned and entered into the cell. If the BOUND function includes multiple inclusive bound range pairs, then the entered value is compared against each inclusive bound pair. If the entered value does not validate against any inclusive bound range pair, then the value of an endpoint of one of the bounded pairs most closely approximating the entered value is applied to the cell.

If the entered value is outside an exclusive bound range of a BOUND function applied to the cell, then the value is entered. If the value is inside an exclusive bound, a determination is made as to which exclusive bound range endpoint the entered value most closely approximates. The most closely approximated exclusive bound range endpoint is returned and is entered into the cell. If the BOUND function includes multiple exclusive bound range pairs, then the entered or evaluated value is compared against each exclusive bound pair. If the value does not validate against any of the exclusive bound pairs, then the value of an endpoint of the bounded exclusive pairs most closing approximating the entered value is applied to the cell.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for formulaically bounding data in a spreadsheet application cell. Methods and systems of the present invention provide for bounding the value of the content of a spreadsheet cell so that only values that are valid according to bounds applied to the cell may be entered into the cell. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
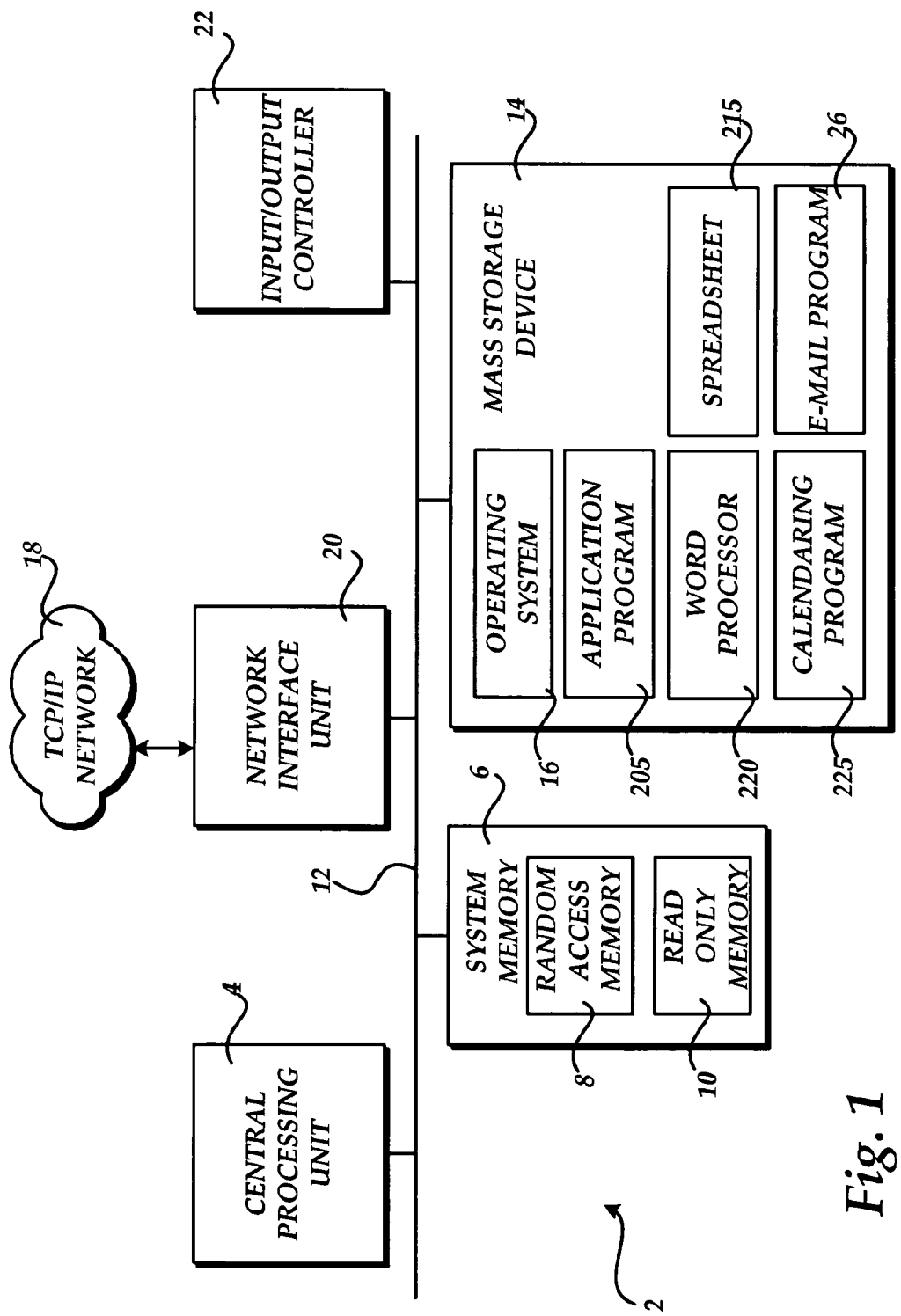
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be assessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 205 for creating and editing an electronic document 24. For instance, according to embodiments of the present invention, the application program 205 may comprise a spreadsheet application 210 as described with reference to FIG. 2 below. Other applications illustrated in FIG. 1 and applicable to embodiments of the present invention include the word processing application 220, the calendar application 225 and the electronic mail application 26.

Figure 2:
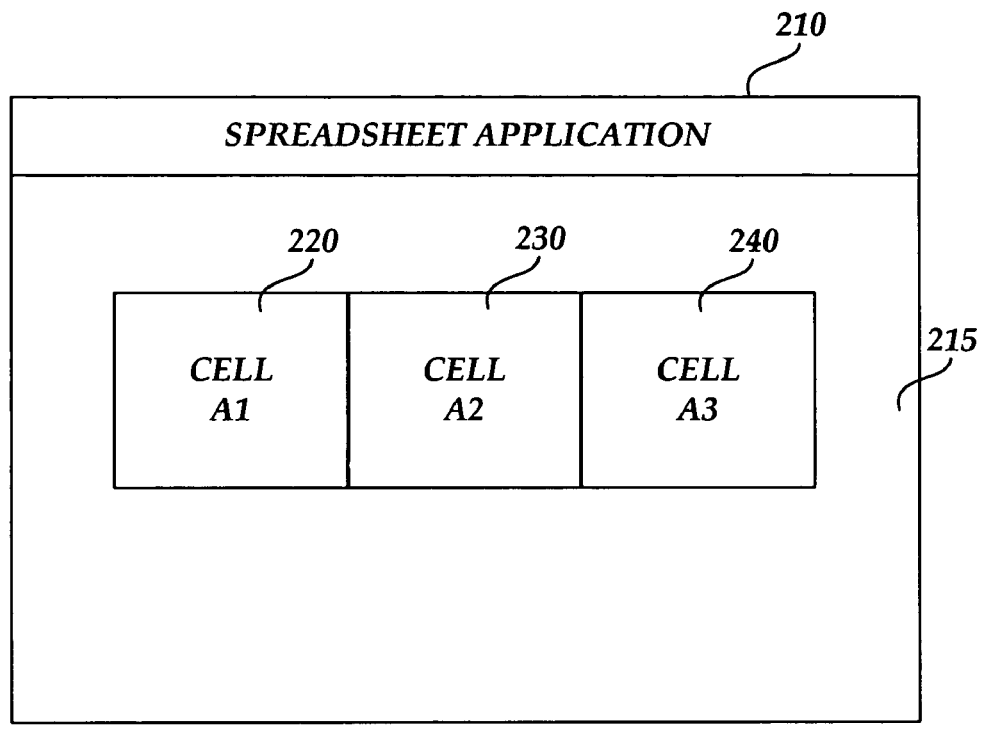
FIG. 2 is a simplified block diagram illustrating a spreadsheet application worksheet or shapesheet according to embodiments of the present invention.

FIG. 2 is a simplified block diagram illustrating a spreadsheet application worksheet or shapesheet according to embodiments of the present invention. The spreadsheet application 210 illustrated in FIG. 2 includes a spreadsheet worksheet 215 or spreadsheet shapesheet 215. A plurality of spreadsheet cells are illustrated including cell A1 (220), cell A2 (230) and cell A3 (240). According to one embodiment of the present invention, the spreadsheet application 210 is illustrative of a spreadsheet application for entering, calculating, manipulating, and displaying data of various forms. An exemplary spreadsheet application 210 includes EXCEL manufactured by Microsoft Corporation of Redmond, Wash.

Using such a spreadsheet application 210, a user may enter data into each of the cells 220, 230, 240, and the user may calculate, manipulate, and display such data. For example, the user may enter inventory-on-hand information as a percentage of maximum inventory, for example 20%, into cell A1. The user may enter a value for the total inventory on hand, for example, 200 units, in the cell A2. The user may enter a value for the maximum inventory, for example 1,000 units, into cell A3. Subsequently, the user may utilize the spreadsheet application 210 to compute valuable data and create valuable presentations associated with the user's inventory data.

According to embodiments of the present invention, and as described in detail below, a BOUND function may be applied to one or more or the cells to validate data being entered into a given cell. That is, a BOUND function may be applied to a given cell to enforce the content of data entered into the cell. For example a BOUND function may be applied to Cell A1 that bounds data entered to between zero and one hundred (100%) percent. If the user attempts to enter data outside the specified bound range, the spreadsheet application 210, in response to the BOUND function, will prevent entry of the data outside the specified bound range.

As mentioned above, the spreadsheet application 210 and spreadsheet 215 are also illustrative of a shapesheet 215 on which a user may create drawings, import images, and the like. An exemplary shapesheet spreadsheet application in VISIO manufactured by Microsoft Corporation of Redmond, Wash. According to such spreadsheet applications, the shapesheet 215 allows the user to create drawings, import images and the like such as FIGS. 1, 2 and 3 of this patent document. The cells 220, 230, 240 of the shapesheet may include data not visible to the user, but which controls the presentation of a drawing or image displayed on the sheet 215. For example, the first cell A1 (220) may include data representing the width of an image displayed on the sheet 215. The second cell A2 (230) may contain data representing the height of that image as a function of the width of the image. The third cell A3 (240) may contain data representing text written on the image. According to embodiments of the present invention, and as described in detail below, a BOUND function may be applied to one or more or the shapesheet cells to validate data being entered into a given cell. For example, a BOUND function may be applied to Cell A1 that bounds data entered to a width of between one and five inches. If the user attempts to enter data outside the specified bound the spreadsheet application 210, in response to the BOUND function, the input will be accepted and retained but the output of the BOUND function will prevent evaluation of the data outside the specified bound range. Thus the bounding parameters may change dynamically and potentially allow the original user input to become valid or invalid as the parameters reevaluate.

As briefly described above, according to embodiments of the present invention, to allow for the improved formulaic bounding or validation of data entered into a spreadsheet or shapesheet cell, a spreadsheet BOUND function is provided. As described herein, this novel spreadsheet function is provided according to a generic spreadsheet computing language such as that found in Microsoft Visio or Microsoft Excel. However, it should be appreciated that the functionality of the present invention may be utilized according to any suitable computing language for programming and utilizing spreadsheet applications.

The BOUND function according to embodiments of the present invention is provided in the format "Bound(value, type, disabled, boundMin, boundMax, [disabled, boundMin, boundMax], . . . )." The value argument is optional and identifies the value to bound, for example a value entered into a cell by a user. Zero may be used as the value if the argument is not provided. The type argument defines bound types. A first type, inclusive bound (0), binds the value between the boundMin and boundMax arguments. A second type, exclusive bound (1), binds the value outside of boundMin and boundMax arguments. A third type, disabled bound (2) returns the value as evaluated. That is, the BOUND function is disabled, and any value entered by the user or evaluated to the cell containing the BOUND function, is entered without regard to the BOUND function. A designation of false for the disabled argument means that the triple (disabled, boundMin, boundMax) is considered in the bound operation (typical). A designation of true for the disabled argument means that the triple is not considered in the bound operation. The boundMin and boundMax arguments designate the lower and upper endpoints of the value bound.

For purposes of example, consider an example BOUND function applied to Cell A1 of the spreadsheet 215, illustrated in FIG. 2, as follows: A1=BOUND(4, 0, false, 5, 10). The value argument of the BOUND function is the bounded formula ("4"). The type argument is set to zero ("0") that means the bound type is inclusive. The disabled argument is set to "false" which means the bound is enabled. The boundMin argument is set to 5 and the boundMax argument is set to 10 that means the bound range is between 5 and 10. Accordingly to this example, the BOUND function will only return a value between 5 and 10. If the bounded formula is already between 5 and 10 then it is returned as the result. If the bounded formula is outside of the prescribed bound range, then the closest included number in the range is returned as the result. In this case the result is 5 because the bounded value or formula of 4 is closest to the lower range of 5. Note that any of the arguments in the BOUND function may be simple to complex functions and/or numerical calculations that may themselves refer to other cells in the spreadsheet, and the like, as is typical of most spreadsheets functions. This allows the BOUND function to dynamically change based on information in a shape and/or diagram cell-based information.

The BOUND function described herein allows for the described behavior at spreadsheet cell set-time. Set-time behavior is behavior that is invoked when a value or formula is set to a spreadsheet cell, as opposed to when the value or formula is evaluated or recalculated. When a new formula is set to a cell containing only a BOUND function, then the new function is set as the first argument of the BOUND function. This makes the first argument essentially an implicit SetAtRefExpr function. If the first argument of the BOUND function contains a SetAtRefExpr function, then the implicit SetAtRefExpr function is ignored, and the explicit SetAtRefExpr function is presumed to be providing the necessary value. For a detailed discussion of the SetAtRefExpr function, the United States Patent Application, entitled "Method and System For Formulaically Redirecting and Modifying Formula Set Operations in a Spreadsheet Application," identification number M&G No. 60001.0306US01/MS305255.01. Suppose the user enters a value of 11 into cell A1 in the example above. The formula for cell A1 then becomes "A1=BOUND(11, 0, false, 5, 10)." The bound range is an inclusive bound, and the entered value of 11 exceeds the bound range. The function re-evaluates to a value of 10 because the entered value of 11 is closest to the range endpoint of 10.

As set forth above, bound types available to the BOUND function include inclusive bounds and exclusive bounds. To determine the result of an inclusive bound (type=0), a copy of the non-disabled inclusive bound pairs (boundMin, boundMax) is obtained by the spreadsheet application. For each bound pair, a determination is made as to whether an entered value falls within the bound range created by the bound pair (e.g., whether boundMin<=value<=boundMax). If the entered or evaluated value is within the inclusive bound range, the value is returned as the result. If the value is outside the bound range, then the "distance" (absolute difference) between the entered value and boundMin, and the distance between entered value and boundMax is computed. The boundMin value or boundMax value that has the shortest distance (as determined above) from the entered or evaluated value is entered into the applicable spreadsheet cell.

A BOUND function may include multiple inclusive bound ranges, for example (1 to 5, 8 to 10 and 14 to 25). When a value is entered or evaluated to a spreadsheet cell having multiple inclusive bound ranges, the value is compared against each bound range. If the value falls within one of the multiple inclusive bound ranges, the value is returned. If the value does not fall within one of the inclusive bound ranges, then the bound range endpoint of one of the multiple inclusive bound ranges that is closest to the entered value is returned.

To determine the result of an exclusive bound (type=1), a copy of the non-disabled exclusive bound pairs (boundMin, boundMax). For each bound pair, a determination is made as to whether an entered value falls within the bound range created by the bound pair. If the entered value does not fall within the bound range, then the value is outside the exclusive bound range and is entered into the applicable spreadsheet cell. If the entered value falls within the bound range, then the endpoint of the exclusive bound range that is closest in terms of absolute distance to the entered value is returned to the applicable cell. For example, if a value of 9 is entered into a cell having an applied exclusive bound function of 5 to 10, a value of 10 will be entered because 9 falls within the exclusive bound range and 10 is the closest endpoint to 9.

As described above for inclusive bound ranges, multiple exclusive bound ranges may likewise be applied to a spreadsheet cell. In such cases, an entered or evaluated value is compared against each of the multiple bound ranges. If the value falls outside all exclusive bound ranges, then the value is returned. If the value falls inside any exclusive bound range, then the closest endpoint is returned, as described above. In the case of overlapping multiple exclusive bound ranges, for example 2 to 5 and 3 to 9, a combined exclusive bound range is created for purposes of returning a value to the applicable spreadsheet cell. If, for example, a value of 4 is entered that falls within both exclusive bound ranges, a combined exclusive bound range of 2 to 9 is created. A determination is then made that the value of 4 is closest to the endpoint 2 of the overlapping ranges, and accordingly, a value of 2 is returned to the applicable cell.

According to embodiments of the present invention, to properly bound angles the values used in the above-mentioned comparisons and computations are normalized to a range of (0 and 2*pi radians). Also, in some spreadsheet engines, such as Microsoft VISIO, support a coordinate point data type (e.g., x, y). For a coordinate point data type value, the bound operation must be applied separately to each coordinate value of the point. For example, for a two-dimensional point type, two results are computed and returned as a point result.

Figure 3:
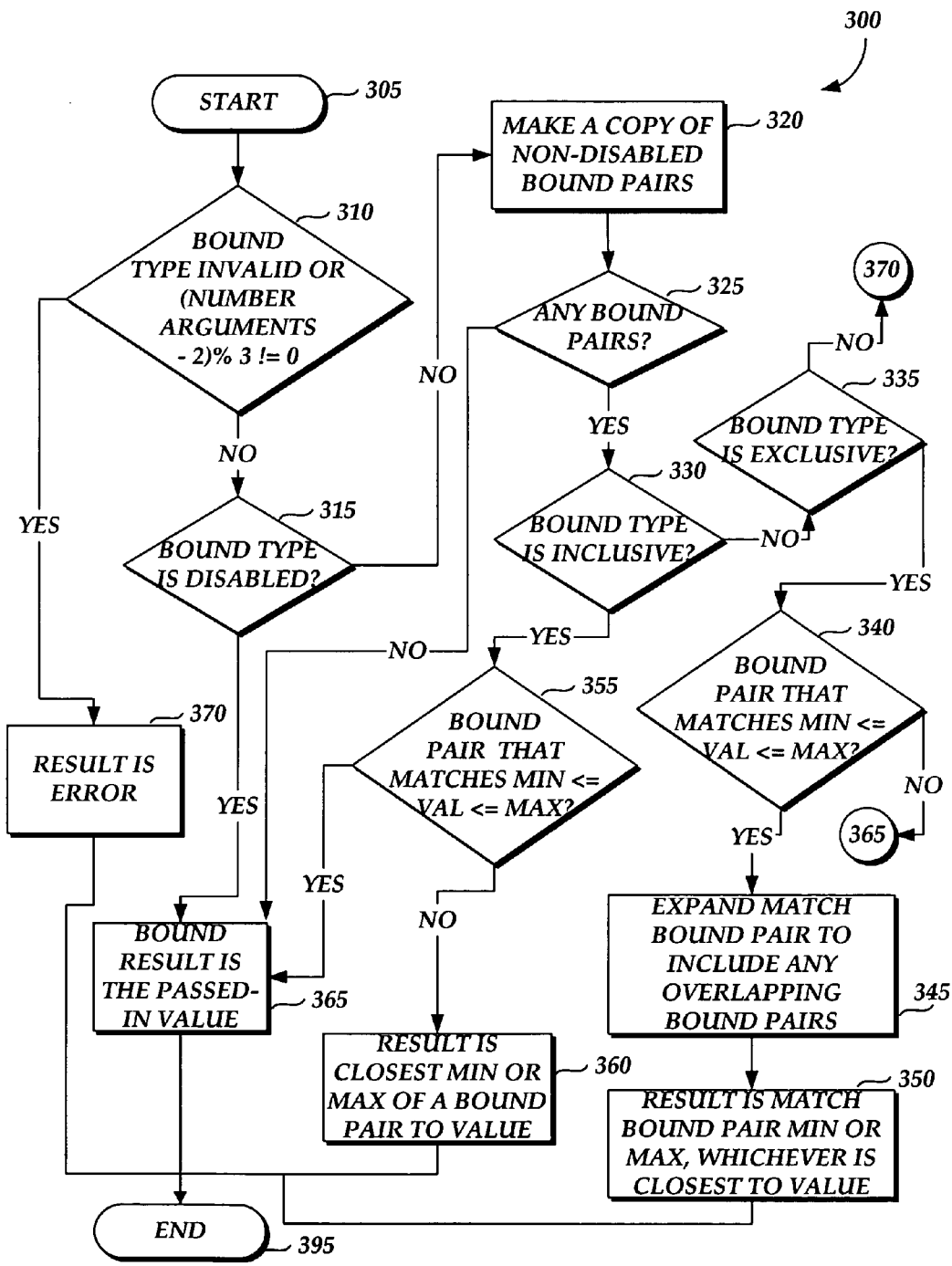
FIG. 3 is a flow diagram illustrating an illustrative routine for formulaically bounding data in a spreadsheet application cell.

FIG. 3 is a flow diagram showing an illustrative routine for formulaically bounding data in a spreadsheet application cell. For purposes of illustration only, the routine shown in FIG. 3 will be described in terms of one or more examples. The routine 300 begins at start block 305 where a user opens a spreadsheet application 210 to enter data into the cells of a spreadsheet 215. Consider for a first example that cell A1 represents percentage of inventory on hand, and consider that a BOUND function has been applied to cell A1 of the form A1=BOUND(150,0,false,0,100). Further, consider that the user has entered a value of 150% into cell A1. Consider for a second example that, at start block 305, the user opens a spreadsheet application 210 and a shapesheet 215 for changing the width of a drawing image displayed on the shapesheet 215. Consider for this example that the cell A2 represents the width value for the image displayed on the shapesheet 215, and consider that a BOUND function has been applied to cell A2 of the form A2=BOUND(4,1,false,1,5). Consider further that the user has entered a value of 4 inches into cell A2. As should be understood by those skilled in the art, the user may enter a value of 4 inches into cell A2 through a variety of means including dragging a width handle of the user's spreadsheet application 210 to increase or decrease the width of the image to which the width change is applied. The first example (spreadsheet 215, cell A1) will be used below for illustrating the operation of the present invention with respect to inclusive bounds, and the second example (shapesheet 215, cell A2) will be used below for illustrating the operation of the present invention with respect to exclusive bounds. For purposes of illustration, the application of the functionality of the present invention is described below with respect to both examples recited above in tandem as each of the steps of the routine 300 are described.

At block 310, the spreadsheet application 210 receives the value (150%) entered by the user into cell A1 and the value of 4 inches entered into cell A2. At block 310, a determination is made as to whether the bound type of the BOUND function applied to cells is invalid. That is, if the bound type is not designated as an inclusive bound, exclusive bound, or if the BOUND function is designated as anything other than disabled or enabled by proper application of the disabled argument of the BOUND function, the routine proceeds to block 370, and an error condition is returned. If the bound type is not invalid, the routine proceeds to block 315, and a determination is made as to whether the bound type is set to disabled. If the bound type in the BOUND function applied to cells A1 or A2 is set to disabled, the routine proceeds to block 365, and the value entered by the user is accepted and is entered into cells A1 or A2, respectively, as described above. That is, the values entered by the user in cell A1 of the spreadsheet 215 and/or cell A2 of the shapesheet 215 are accepted regardless of the argument values of the applied BOUND functions.

If the bound type is not disabled, the routine proceeds to block 320, and the spreadsheet application 210 obtains the inclusive bound pairs or exclusive bound pairs prescribed by the applicable BOUND functions applied to cell A1 or cell A2. According to the example BOUND functions applied to cells A1 and A2 above, an inclusive bound of between 0 and 100% is applied by the BOUND function to cell A1, and an exclusive bound of between 1 and 5 inches is applied by the BOUND function to cell A2. At block 325, a determination is made by the spreadsheet application as to whether any bound pairs are prescribed for the BOUND functions applied to cells A1 and A2. If no bound pairs are prescribed, the routine proceeds to block 365, and the values entered by the user are entered into cells A1 and A2 without regard to the BOUND functions applied to cells A1 and A2.

At block 330, a determination is made as to whether the bound type of a BOUND function applied to the applicable cell is an inclusive bound type. According to the example BOUND function described above, an inclusive bound pair bounding values applied to cell A1 to between 0 and 100% is prescribed by the BOUND function. Accordingly, with respect to the BOUND function applied to cell A1, the routine proceeds to block 355. At block 355, a determination is made as to whether the value entered by the user falls within the inclusive bound prescribed by the BOUND function applied to cell A1. Following the example provided for cell A1, if the user enters a value between 0 and 100% for cell A1, then the value entered by the user is valid with respect to the inclusive bound applied to cell A1. The routine proceeds to block 365, and the value entered by the user is applied to cell A1.

Returning back to block 355, and following the example provided above, the user enters a value of 150% that exceeds the inclusive bound values of 0 to 100%. As a result, the routine proceeds to block 360. At block 360, a determination is made as to which endpoint of the inclusive bound pair (0, 100) most closely approximates the value entered into by the user. According to this example, the entered value of 150% most closely approximates the endpoint of 100, and consequently, at block 360, the bound maximum value of 100% is entered into cell A1. Thus, the BOUND function applied to A1 has prevented the user from entering a value exceeding or otherwise invalidating the value bounds placed on cell A1 as prescribed by the BOUND function applied to cell A1.

Referring back to block 330, if the bound type is not inclusive, the routine proceeds to block 335, and a determination is made as to whether a bound type applied by the BOUND function to the applicable spreadsheet cell is an exclusive bound type. If at block 335, a determination is made that no exclusive bound type is prescribed by the BOUND function applied to the applicable cell, and a determination was made at block 330 that no inclusive bound type is applied by the BOUND function to the applicable cell, the routine proceeds to block 370, and an error condition is returned.

Referring to the second example provided above, a BOUND function has been applied to cell A2 of the shapesheet 215 wherein an exclusive bound with a bound minimum of 1 inch and a bound maximum of 5 inches is applied to cell A2. With respect to this example BOUND function the routine proceeds to block 340. At block 340, a determination is made as to whether the value entered by the user for cell A2 of the shapesheet 215 falls within the exclusive bound values prescribed by the BOUND function applied to cell A2. If the value entered by the user, does not fall within the exclusive bound values prescribed by the BOUND function, then the value entered by the user is a valid value, and the routine proceeds to block 365 where the value entered by the user is accepted. For example, if the user enters a width value into cell A2 outside the exclusive bounds of between 1 and 5 inches prescribed by the BOUND function applied to cell A2 (for example, the user slides the width handle to a value of 6 inches), then the value entered by the user is accepted into cell A2.

Referring back to block 340, if the value entered by the user falls within the exclusive bound range pairs of between 1 and 5 inches, the routine proceeds to block 345. For example, according to this example, an exclusive bound pair of between 1 and 5 inches is prescribed by the BOUND function applied to cell A2. That is, any value to be validated and entered into cell A2 according to the BOUND function applied to cell A2 must be less than 1 inch or greater than 5 inches. The value may not fall between 1 and 5 inches to be validated by the BOUND function. At block 345, an exclusive bound pair within which the entered value falls may be expanded to include overlapping bound pairs in a case where multiple exclusive bound pairs have been applied by the BOUND function to cell A2. For example, if a first bound pair prescribed by the BOUND function applied to cell A2 includes the pair 1 to 5 inches and a second bound pair includes the bound pair 4 to 7 inches, then two overlapping exclusive bound pairs are prescribed for the applicable cell.

At block 345, the bound pair within which the entered value falls is expanded to the overlapping bound pair to create an expanded bound pair of between 1 and 7 inches (according to this example). Following from the example BOUND function applied to cell A2, if the user enters a value of 4 inches which falls within the exclusive bound pair of 1 to 5, a determination is made at block 350 that the entered value of 4 most closely approximates the exclusive bound endpoint of 5 inches, and accordingly, a value of 5 inches is returned and is entered at cell A2. In the case of the overlapping exclusive bound pairs, whereby a combined exclusive bound pair is created, for example, a bound pair of between 1 and 7 inches described above, a like analysis is performed to determine which endpoint of the combined overlapping exclusive bound pairs the entered value most closely approximates. According to this example, a value of 4 entered by the user most closely approximates a value of 7 that is the exclusive bound maximum of the combined overlapping exclusive bound pairs. Thus, at block 350, a value of 7 inches is returned and is entered at cell A2 for the width of the image to which cell A2 applies. The routine ends at block 395.

The following are additional examples of the operation of the invention as described herein. As should be appreciated, the following examples are for illustration only and are not limiting of any alternate uses of the functionality described herein. For a first additional example, consider a spreadsheet shape where a BOUND function has been applied to an associated width cell requiring that the width of the shape must always be as wide as text displayed on the shape. A BOUND function may be applied to the width cell as follow: Width=MAX(TEXTWIDTH(TheText),SETATREFEXPR (13 ft 11.0863 in)). Alternatively, a BOUND function may be applied as follows: WIdth=BOUND(4 ft 7.6295 in,1, FALSE,-1,TEXTWIDTH(TheText)). For another additional example, consider a BOUND function used to limit a value called "Prop.Integer" to discrete values. This example also illustrates the use of multiple inclusive bound ranges. Such a BOUND function may be constructed as follows: Prop.Integer=BOUND(3.75, 0, FALSE, 1, 1, FALSE, 2, 2, FALSE, 3, 3, FALSE, 4, 4, FALSE, 5, 5).

As described herein, methods and systems are provided for bounding the value of the content of a spreadsheet cell so that only values validated according to the prescribed bounds may be entered into the applicable spreadsheet cell. It will be apparent that those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A computer-implemented method for formulaically bounding an application cell to a range of values, the method comprising:

associating a bounding formula with an application cell, wherein the bounding formula includes a predetermined range of permitted values,
  wherein the bounding formula includes at least one member of a group comprising: a type argument, a bound maximum argument, and a bound minimum argument,
  wherein the type argument includes at least one member of a group comprising: a range of permitted values associated with an inclusive bound type argument, and a range of permitted values associated with an exclusive bound type argument;
receiving a value associated with the application cell;
determining whether the receive value is within the predetermined range of permitted values of the bounding formula;
permitting the received value when the received value is within the predetermined range of permitted values of the bounding formula; and
automatically changing the received value to a value within the predetermined range of permitted values of the bounding formula when the received value is outside the predetermined range of permitted values of the bounding formula.

2. The computer-implemented method of claim 1 wherein the application cell includes at least one member of a group comprising: a spreadsheet application cell and a drawing application cell.

3. The computer-implemented method of claim 1 wherein the received value is associated with at least one member of a group of members comprising: a user input value and a value resulting from a formulaic computation associated with the application cell.

4. The computer-implemented method of claim 1 wherein the bounding formula includes a disable argument for disabling the bounding formula when the disable argument is designated.

5. The computer-implemented method of claim 1 wherein automatically changing the received value to a value within the predetermined range of permitted values includes automatically changing the received value to a value within the predetermined range of values that is closest to the received value.

6. The system of claim 1 wherein the bounding formula includes a value argument.

7. The computer-implemented method of claim 1 wherein the predetermined range of values of the bounding formula is an inclusive range of values, wherein the received value is not within the inclusive range of values, wherein automatically changing the received value further includes:
  determining a value within the inclusive range of values that is closest to the received value, and
  automatically changing the received value to the value within the inclusive range of values that is closest to the received value.

8. The computer-implemented method of claim 1 wherein the bounding formula includes an exclusive type argument, wherein the predetermined range of permitted values includes values outside a defined range of values associated with the exclusive type argument, wherein the received value is within the defined range of values associated with the exclusive type arguments, wherein automatically changing the received value further includes:
  determining a value within the range of permitted values that is closest to the received value, and
  automatically changing the received value to the value within the range of permitted values that is closest to the received value.

9. A computer-readable medium having computer-executable instructions for providing an object bounding formula for automatically changing a received object value to conform to a range of permitted values associated with the object bounding formula, the instructions comprising:
  binding an object with the object bounding formula, wherein the object bounding formula includes a predetermined range of permitted values, wherein the object is bound by the predetermined range of permitted values;
  receiving a value associated with the object;
  determining whether the value is within the predetermined range of permitted values of the object bounding formula;
  permitting the received value when the received value is within the predetermined range of permitted values of the object bounding formula; and
  automatically changing the received value to a closest value within the predetermined range of permitted values when the received value is outside the predetermined range of permitted values.

10. The computer-readable medium of claim 9 wherein the object includes at least one member of a group comprising: a spreadsheet object and a drawing object.

11. The computer-readable medium of claim 9 wherein the object bounding formula includes at least one member of a group comprising: a type argument, a bound maximum argument, and a bound minimum argument.

12. The computer-implemented method of claim 9 wherein the predetermined range of permitted values includes at least one member of a group comprising: a range of permitted values associated with an inclusive bound type argument, and a range of permitted values associated with an exclusive bound type argument.

13. The computer-implemented method of claim 9 wherein the received value is associated with at least one member of a group of members comprising: a user input value and a value resulting from a formulaic computation associated with the application cell.

14. The computer-implemented method of claim 9 wherein the bounding formula includes a disable argument for disabling the bounding formula when the disable argument is designated.

15. The system of claim 9 wherein the bounding formula includes a value argument.

16. The computer-readable medium of claim 9 wherein the predetermined range of values of the object bounding formula is an inclusive range of values, wherein the received values is not within the inclusive range of values, wherein automatically changing the received value further includes:
  determining a value within the inclusive range of values that is closest to the received value, and
  automatically changing the received value to the value within the inclusive range of value that is closest to the received value.

17. The computer-readable medium of claim 9 wherein the object bounding formula includes an exclusive type argument, wherein the predetermined range of permitted values includes values outside a range of values associated with the exclusive type argument, wherein the received value is within the range of values associated with the exclusive type argument, wherein automatically changing the received value further includes:

determining a value within the range of permitted values that is closest to the received value, and automatically changing the received value to a value within the range of permitted values that is closest to the received value.

18. A computing system for formulaically bounding a cell in a spreadsheet, the system comprising:

a processor, a memory having computer-executable instructions associated therewith, wherein the computer-executable instructions are configured to:

provide a spreadsheet cell for receiving a value;

bind the spreadsheet cell with a cell bounding formula, wherein the cell bounding formula includes a predetermined range of values associated with a bounding class;

receive a value associated with the spreadsheet cell;

apply the received value to the cell bounding formula to determine whether the received value is associated with the predetermined range of values associated with the bounding class;

automatically permit the received value when the received value is associated with the predetermined range of values associated with the bounding class; and automatically change the value to a closest value of the predetermined range of values associated with the bounding class when the received value is not associated with the predetermined range of values associated with the bounding class.

19. The system of claim 18 wherein the bounding formula includes at least one member of a group comprising: a type argument, a bound maximum argument, and a bound minimum argument.

20. The system of claim 18 wherein the bounding class includes at least one member comprising: an inclusive bounding class and an exclusive bounding class.

21. The system of claim 18 wherein the received value is associated with at least one member of a group of members comprising: a user input value and a value resulting from a formulaic computation associated with the spreadsheet cell.

22. The computer-implemented method of claim 18 wherein the bounding formula includes a disable argument for disabling the bounding formula when the disable argument is designated.

23. The system of claim 18 wherein the bounding formula includes a value argument.

24. The system of claim 18 wherein the predetermined range of values of the bounding formula is associated with an inclusive bounding class, wherein the received value is not within the inclusive bounding class, wherein automatically changing the receive value further includes:

determining a value within the inclusive bounding class that is closest to the received value, and automatically changing the received value to the value within the inclusive bounding class that is closest to the received value.

25. The system of claim 18 wherein the bounding formula includes an exclusive bounding class, wherein the predetermined range of permitted values includes values outside the exclusive bounding class, wherein the received value is within the exclusive bounding class, wherein automatically changing the received value further includes:

determining a value within the range of permitted values that is closest to the received value, and automatically changing the receive value to the value within the range of permitted values that is closest to the received value.

* * * * *